United States Patent
Chandrappa et al.

(10) Patent No.: US 11,042,392 B2
(45) Date of Patent: Jun. 22, 2021

(54) NETWORK POLICY AND FLOW STATE SAVE/RESTORE FOR HIGHLY AVAILABLE SERVICING

(71) Applicant: Microsoft Technology Licensing, LLC, Redmond, WA (US)

(72) Inventors: Harish Kumar Chandrappa, Bothell, WA (US); Milan Dasgupta, Seattle, WA (US); Daniel Max Firestone, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 16/442,072

(22) Filed: Jun. 14, 2019

(65) Prior Publication Data

US 2020/0394060 A1 Dec. 17, 2020

(51) Int. Cl.
*G06F 9/455* (2018.01)
*G06F 9/50* (2006.01)

(52) U.S. Cl.
CPC ........ *G06F 9/45533* (2013.01); *G06F 9/5016* (2013.01)

(58) Field of Classification Search
CPC ............... G06F 9/45533; G06F 9/5016; G06F 2009/45595; H04L 41/00
See application file for complete search history.

(56) References Cited

U.S. PATENT DOCUMENTS

| | | | |
|---|---|---|---|
| 7,174,451 B2 | 2/2007 | Zimmer et al. | |
| 8,930,690 B2 | 1/2015 | Zuo et al. | |
| 8,990,433 B2 | 3/2015 | Wu | |
| 9,680,772 B2 | 6/2017 | Kothari et al. | |
| 2006/0206300 A1* | 9/2006 | Garg | G06F 9/545 703/27 |
| 2007/0030859 A1* | 2/2007 | Pope | G06F 13/4282 370/463 |

(Continued)

OTHER PUBLICATIONS

Tarek S. Sobh; AKFS: A Kernel-mode Firewall System; Fourth International Conference on Informatics and Systems, Mar. 25-27, 2006 (Year: 2006).*

(Continued)

*Primary Examiner* — Doug U Kim
(74) *Attorney, Agent, or Firm* — Newport IP, LLC; Han Gim

(57) ABSTRACT

Described herein is a system and method for flow state save/restore of a virtual filtering platform. A first instance of a driver manages policy and flow state for ongoing flows between client device(s) and virtual machine(s). The virtual filtering platform is transitioned from the first instance of a driver to a second instance of the driver by serializing the policy and state for the ongoing flows on the first instance of the driver using a one pass algorithm. The serialized policy and state for the ongoing flows can be de-serialized with the ongoing flows re-established and/or reconciled on the second instance of the driver in accordance with the de-serialized policy and state for the plurality of ongoing flows. In some embodiments, a memory management technique can use a single operating system memory allocation call to allocate memory for the transition, with the technique managing utilization of the allocation memory.

20 Claims, 5 Drawing Sheets

(56) References Cited

U.S. PATENT DOCUMENTS

2017/0054686 A1    2/2017  Malkov et al.

OTHER PUBLICATIONS

Firestone, Daniel, "VFP: A Virtual Switch Platform for Host SDN in the Public Cloud", In Proceedings of the 14th USENIX Symposium on Networked Systems Design and Implementation, Mar. 27, 2017, pp. 315-328.
Pfaff, et al., "The Design and Implementation of Open vSwitch", In Proceedings of the 12th USENIX Symposium on Networked Systems Design and Implementation, May 4, 2015, pp. 117-130.

* cited by examiner

NETWORK POLICY AND FLOW STATE SAVE/RESTORE FOR HIGHLY AVAILABLE SERVICING

BACKGROUND

Cloud-based networks allow computer processing and storing needs to be moved from on premises networks to hybrid cloud or fully cloud-based networks while satisfying data security access requirements. A cloud-based network may include physical machines (PMs) and virtual machines (VMs). Cloud applications may be implemented via the PMs and/or the VMs. The cloud applications can be accessed from client stations of organizations at remote locations.

SUMMARY

Described herein is a system for policy and flow state save/restore, comprising: a computer comprising a processor and a memory having computer-executable instructions stored thereupon which, when executed by the processor, cause the computer to: receive a request to transition a virtual filtering platform from a first instance of a driver to a second instance of the driver, wherein the first instance of the driver manages policy and flow state for a plurality of ongoing flows between one or more client devices and one or more virtual machines; serialize the policy and state for the plurality of ongoing flows on the first instance of the driver using a one pass algorithm; unload the first instance of the driver; load the second instance of the driver; de-serialize the serialized policy and state for the plurality of ongoing flows; and, reconciling the plurality of ongoing flows on the second instance of the driver in accordance with the de-serialized policy and state for the plurality of ongoing flows (e.g., preserving all ongoing connections from/to virtual machines and remote machines).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
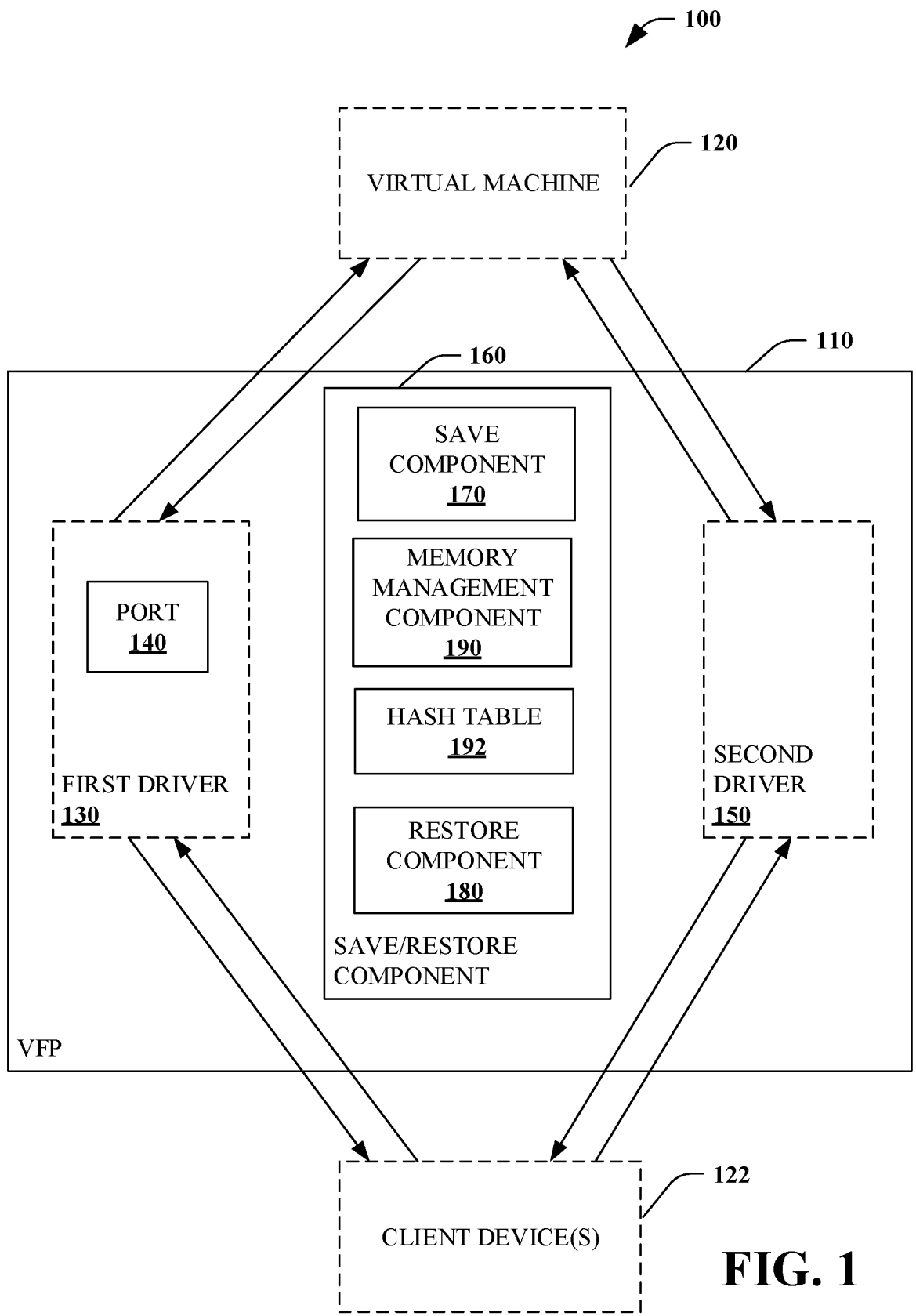
FIG. 1 is a functional block diagram that illustrates a system for flow state save/restore.

Various technologies pertaining to network policy and flow state save/restore for highly available servicing of a virtual filtering platform (VFP) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding network flow state save/restore for highly available servicing of a VFP and/or a software-defined networking (SDN) dataplane component. What follows are one or more exemplary systems and methods.

Aspects of the subject disclosure pertain to the technical problem of network flow state save/restore during updating of a driver of a virtual filtering platform. The technical features associated with addressing this problem involve receiving a request to transition a virtual filtering platform from a first instance of a driver to a second instance of the driver, wherein the first instance of the driver manages policy and flow state for a plurality of ongoing flows between one or more client devices and one or more virtual machines; serializing the policy and state for the plurality of ongoing flows on the first instance of the driver using a one pass algorithm (e.g., onto a fast memory store); unloading the first instance of the driver; loading the second instance of the driver; de-serializing the serialized policy and state for the plurality of ongoing flows; and, reconciling the plurality of ongoing flows on the second instance of the driver in accordance with the de-serialized policy and state for the plurality of ongoing flows. Accordingly, aspects of these technical features exhibit technical effects of more efficiently and effectively updating driver(s) of the VFP, for example, reducing consumption of computing resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Cloud-based networks allow computer processing and storing needs to be moved from on premises networks to hybrid cloud or fully cloud-based networks while satisfying data security access requirements. A virtual filtering platform (VFP) is responsible for applying network policy(ies) on network packet(s) coming in/out of virtual machine(s) (VMs). In order to apply these network policy(ies), the VFP maintains connection states regarding individual flows.

Conventionally, when updates to the VFP occurred, virtual machines lost these connection states on the updated VFP. A software defined networking (SDN) control plane agent detects an absence of policy(ies) in the VFP and start reprogramming the VFP (which can take tens of seconds). Additionally, there are certain resources like network address translation (NAT) ports that are only allocated when a transmission control protocol (TCP) connection is created or when the first packet (e.g., handshake) is seen on a connection. Since this binding was not conventionally preserved across updates there was no way to resume connection resulting in the VM losing its connections. The VFP would therefore need to recreate these connection states, and in some instances customers would have to reestablish their connections. This caused quite a noticeable impact to the customer's experience.

Described herein is a system and method for saving connection flow state of an original VFP driver ("driver") (e.g., prior to update) and restoring the connection flow state on an updated driver (e.g., after update) so that impact resulting from driver update (e.g., to a customer or client of the customer) can be minimalized. By saving/restoring connection flow state, TCP connections can be resumed with minimal retransmission. For purposes of explanation and not limitation, the system and method are discussed with reference to a VFP; however, in some embodiments, the system and method can be utilized with other SDN dataplane component(s).

Referring to FIG. 1, a system for flow state save/restore 100 is illustrated. The system 100 includes a virtual filtering platform 110 that applies network policy(ies) on network packet(s) originating from or destined to a particular virtual machine(s) 120 (to or from a client device 122). The virtual filtering platform 110 can include a first driver 130 having port(s) 140, for example, each port 140 can correspond to a particular virtual machine 120.

The system 100 can facilitate live transitioning of the virtual filtering platform 110 from utilizing the first driver 130 to apply network policy(ies) to a second driver 150 (e.g., updated instance of the first driver 130). In this manner, impact of the transition to user(s) of the virtual machine(s) 120 can be minimized. In some embodiments, packet processing by the virtual filtering platform 110 is suspended while the first driver 130 is transitioned to the second driver 150. For example, packet processing by the virtual filtering platform 110 (e.g., using the second driver 150) can be restarted once ongoing flows of the first driver 130 have been re-established on the second driver 150.

The virtual filtering platform 110 can employ a save/restore component 160 to facilitate the live transition from the first driver 130 to the second driver 150. The save/restore component 160 can include a save component 170, a restore component 180, and, optionally, a memory management component 190. In some embodiments, the save/restore component 160 (or components thereof) are a component of the virtual filtering platform 110. In some embodiments, the save/restore component 160 (or components thereof) are external to the virtual filtering platform 110.

The save component 170 can save policy and state associated with each port 140. The state associated with each port 140 can comprise objects including layers, groups, and/or rules. Layers include stateful flow tables that hold match-action-table(s) (MAT) policy to be applied to ingress traffic (from virtual machine(s) 120) and/or egress traffic (to virtual machine(s) 120). Groups are entities to manage and control related groups of rules within a particular layer. Rules comprise the MAT entries themselves.

Figure 2:
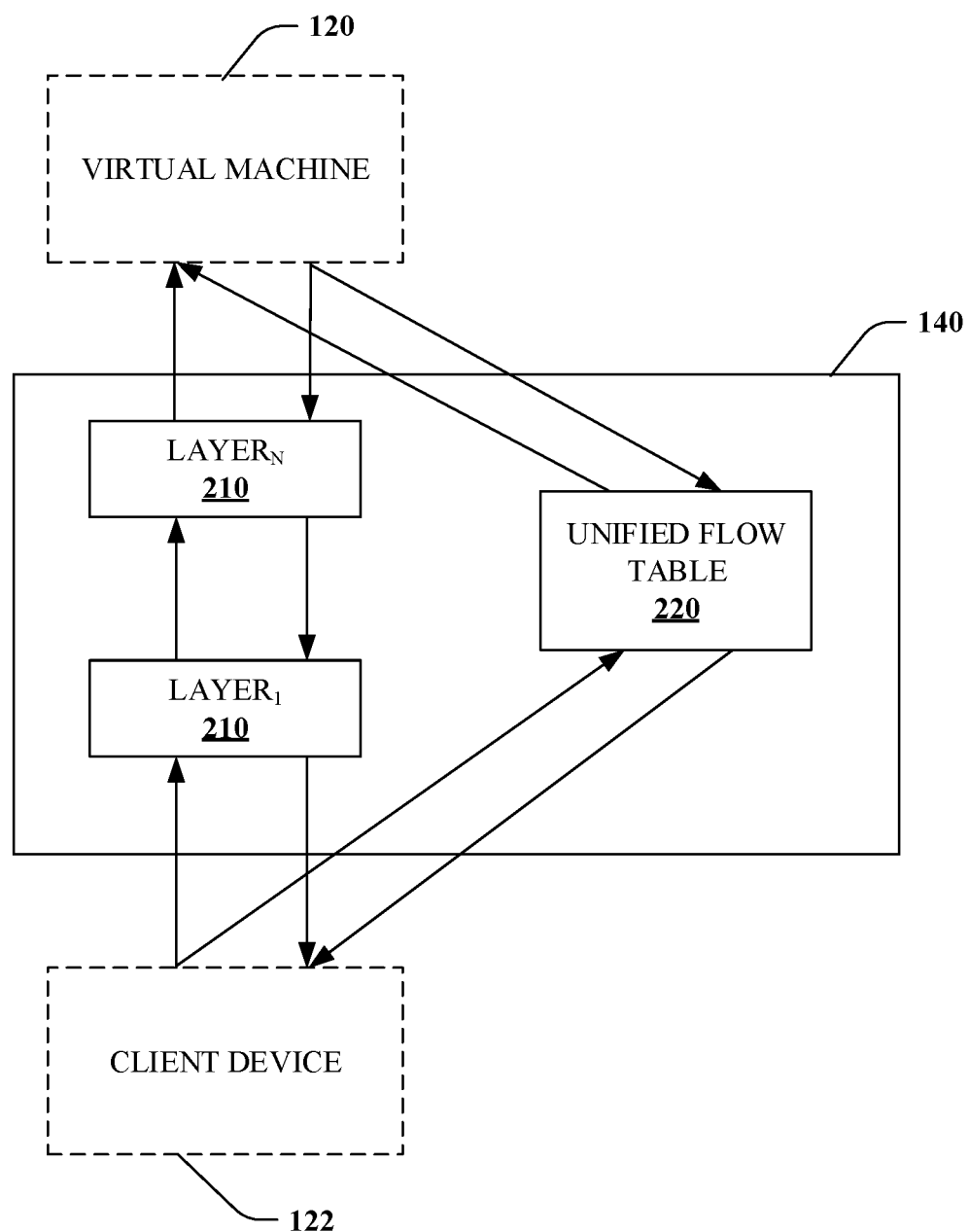
FIG. 2 is a functional block diagram that illustrates an exemplary port.

Referring brief to FIG. 2, an exemplary port 140 can include one or more layers 210 that applying rule(s) and/or policy to packets to and/or from the virtual machine(s) 120. In order to expedite subsequent packet handling of a particular flow, once the layers 210 have been applied to an initial packet, action(s) to be taken with respect to subsequent packets of the particular flow can be cached in a unified flow table 220. This allows the subsequent packets to be processed by bypassing the layers 210 and applying information cached in the unified flow table 220.

Turning back to FIG. 1, in some embodiments, the save component 170 can utilize a one pass algorithm in order to minimize flow interruption time during the transition from the first driver 130 to the second driver 150. The one pass algorithm can snapshot the state associated with the first driver 130 including static and dynamic state. Static policy(ies) are programmed during instantiation of the first driver 130 and/or updated after instantiation. These static policy(ies) can be stored hierarchically and are able to be queried, saved, and, restored.

However, in some embodiments, the first driver 130 can maintain information regarding complex relationship(s) (e.g., meta state) related to flow(s), for example, flow(s), unified flow(s), rule(s), mapping(s), network address translation (NAT) port(s), rule context(s), action context(s), and/or data structure(s) (e.g., hash table(s), tree(s), list(s), array(s)). For example, at run time, flow(s) can create and track additional meta state that is only referenced by the particular flow(s) and generally not discoverable from the static policy hierarchy. In some embodiments, this meta state can be external to the flow and reference counted to share with other entity(ies).

In some embodiments, the save component 170 can utilize a dependency model in which an object serializes its dependency(ies) prior to serializing itself. Thus, the meta state associated with a particular flow and/or rule is serialized before the particular flow and/or rule is serialized.

This meta state can be tracked in a dynamic hash table 192 (as described below) and cached until a flow corresponding to the meta state arrives during restore by the restore component 180. The flow then claims a particular object. Until claimed, the hash table 192 owns these meta objects that are temporary and/or transient. This can facilitate to ensure that no objects are leaked after restore as everything that's owned in the hash table 192 will be cleaned-up by the restore component 180 and/or the save/restore component 160.

When saving policy and state associated with each port 140, the save component 170 can create the dynamic hash table 192 to track which objects/state have been serialized. In some embodiments, the dynamic hash table 192 can prevent duplicate copy(ies) of a same object from being serialized (e.g., stored) thus mitigating transition time and/or reducing consumption of computing resource(s). For example, when attempting to write an entry to the dynamic hash table 192, the save component 170 can determine that an entry already been written. Accordingly, the save component 170 can prevent creating a duplicative entry in the dynamic hash table 192, and, prevent duplicative serialization of an object pointed to be the entry. During de-serialization, this hash table 192 can also provide the metadata mapping (e.g., pointers) of the objects from the first driver 130 (e.g., first instance of the driver) to the second driver 150 (e.g., second instance of the driver) so that the rule and flow dependencies can be resolved.

The restore component 180 can thus de-serialize the serialized policy and state for the plurality of ongoing flows (e.g., re-establish the plurality of ongoing flows). The restore component 180 can reconcile the plurality of ongoing flows on the second driver 150 in accordance with the de-serialized policy and state for the plurality of ongoing flows.

In some embodiments, the de-serialization and re-establishment of the plurality of ongoing flows by the restore component 180 is an atomic process. That is, if any one of the plurality of object(s) of the flow(s) and/or the state is not able to be restored and/or re-established, the entire restore operation fails. The save/restore component 160 can further clean-up state and report a failure.

The dynamic hash table 192 can further be utilized by the restore component 180 to track which objects/state have been deserialized (e.g., restored). For example, old serialized objects can be mapped to new ones during a deserialization operation by the restore component 180.

In some embodiments, the dynamic hash table 192 can further assist with temporarily caching object(s), and/or, with pointer fix-up for object correlation between the first driver 130 (e.g., old driver instance) and the second driver 150 (e.g., new driver instance).

In some embodiments, the save/restore component 160 can employ a memory management scheme. For example, a large quantity of objects (e.g., millions) may be needed to be allocated in the dynamic hash table 192 as there can be an entry for each object (e.g., flow, rule, etc.). Memory allocation using an operating system call for each allocation for a large quantity (e.g., millions) of objects can take a non-trivial amount of time (e.g., 10's of seconds) resulting in an unacceptable level of service to the virtual machine(s) 120 and/or client(s) of the virtual machine(s) 120 impacting ongoing connections being torn.

In some embodiments, the memory management component 190 can allocate block(s) of memory (e.g., large pages) at the start of the save/restore operation. In some embodiments, the memory manager component 190 utilizes a single operating system memory allocation call to allocate memory for the transition from the first driver 130 to the second driver 150. The memory management component 190 then manages use of the allocated memory as a memory pool for the save component 170 and/or the restore component 180 to allocate portions(s) of the allocated memory (e.g., of desired size of object(s)) for use during the transition.

By utilizing the memory management component 190 instead of individual operating system memory allocation for each object, the system 100 can significantly reduce latency time for performing the transition from the first driver 130 to the second driver 150. By allocating portion(s) of the allocated memory of desired size(s), as specified by the save component 170, the system 100 can reduce overall memory consumption utilized during the transition. Additionally, by storing the saved state (e.g., objects) in memory (e.g., RAM) instead of to disk, storage time can be reduced as saving state to disk would add non-trivial latency and negatively impact the transition.

In some embodiments, the save component 170 can determine a quantity of objects being saved. For example, some VM ports have 100s of flows while others may have 100K flows. To optimize performance and/or memory allocation, the save component 170 can save hint(s) at the start of the serialized state to hint at how much state is being saved. The restore component 180 can utilize these hint(s) at restore time in order to optimize performance.

Figure 3:
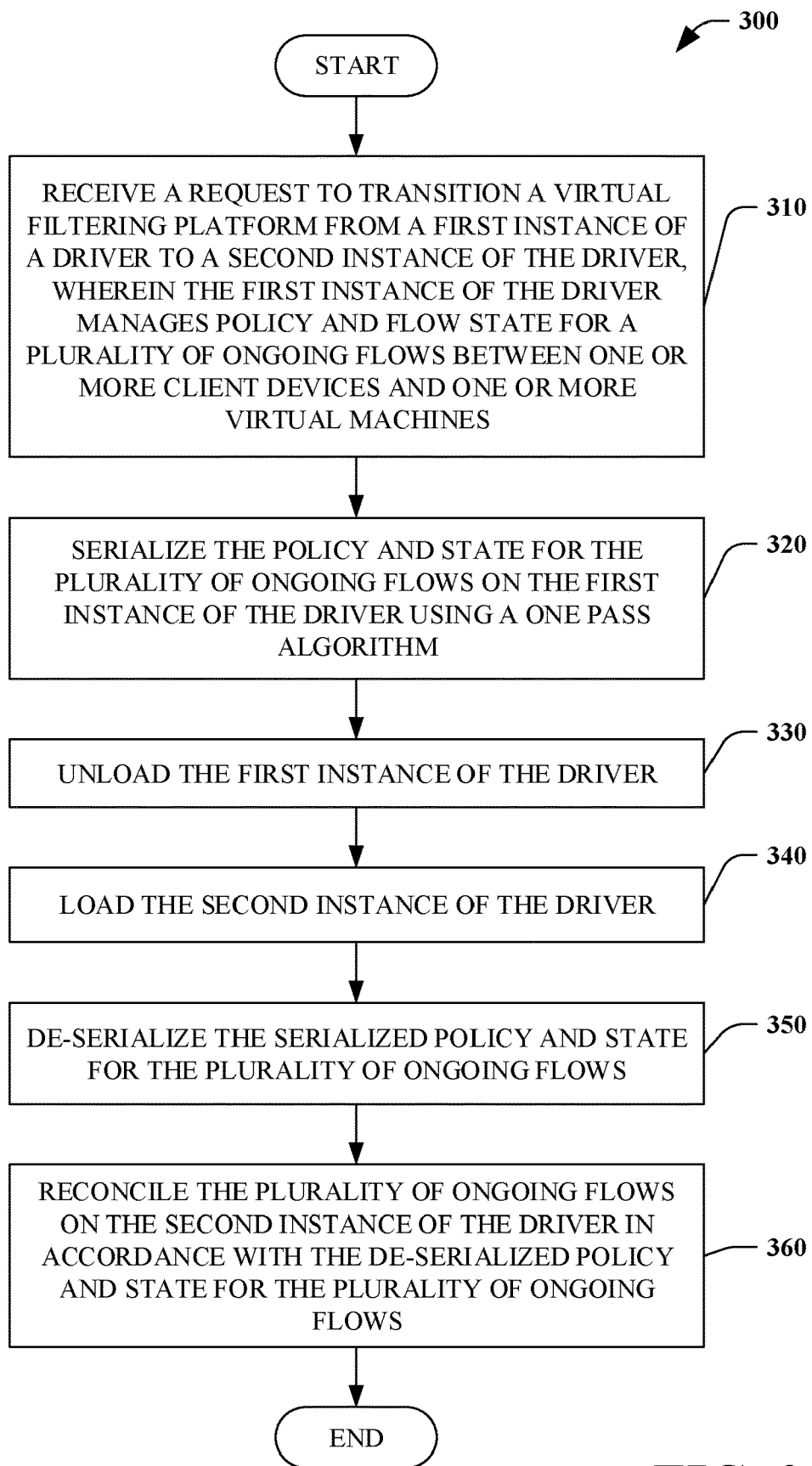
FIG. 3 is a flow chart of a method of performing virtual filtering platform flow state save/restore.
Figure 4:
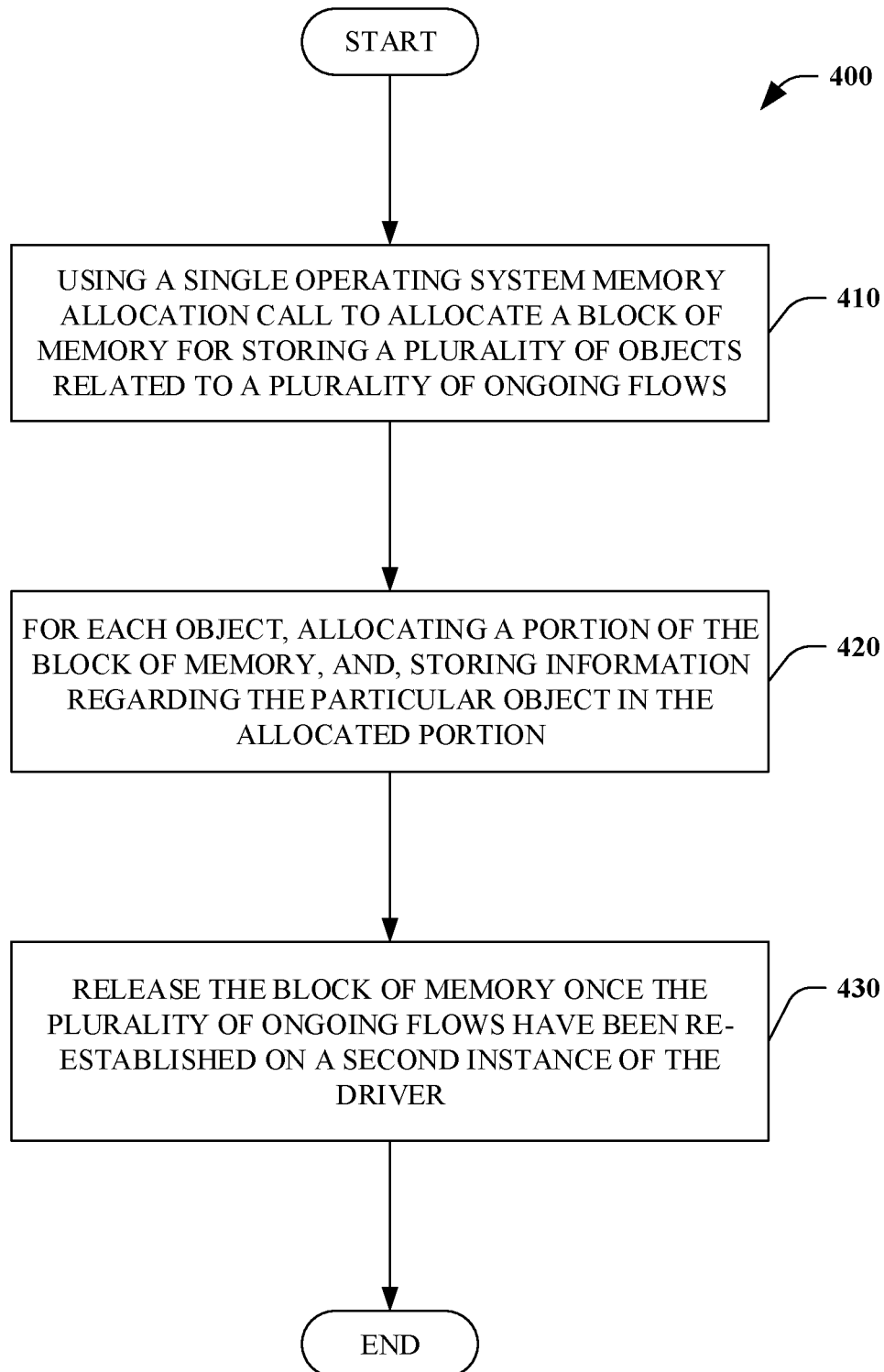
FIG. 4 is a flow chart of a method of performing virtual filtering platform flow state save/restore.

FIGS. 3 and 4 illustrate exemplary methodologies relating to virtual filtering platform flow state save and/or restore. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of performing virtual filtering platform flow state save/restore 300 is illustrated. In some embodiments, the method 300 is performed by the system 100.

At 310, a request to transition a virtual filtering platform from a first instance of a driver to a second instance of the driver is received. The first instance of the driver manages policy and flow state for a plurality of ongoing flows between one or more client devices and one or more virtual machines. In some embodiments, acts 310, 320, 330, 340, and/or 350 are performed in response to the received request.

At 320, the policy and state for the plurality of ongoing flows on the first instance of the driver 130 is serialized (e.g., saved/stored) using a one pass algorithm. At 330, the first instance of the driver is unloaded. At 340, the second instance of the driver is loaded (e.g., instantiated).

At 350, the serialized policy and state for the plurality of ongoing flows is de-serialized (e.g., re-establishing the plurality of ongoing flows). At 360, the plurality of ongoing flows on the second instance of the driver are reconciled in accordance with the de-serialized policy and state for the plurality of ongoing flows.

Turning to FIG. 4, a method of performing virtual filtering platform flow state save/restore 400 is illustrated. In some embodiments, the method 400 can be performed by the system 100.

At 410, a single operating system memory allocation call is used to allocate a block of memory for storing information regarding a plurality of objects related to the plurality of ongoing flows. At 420, for each object, a portion of the block of memory is allocated. Information regarding the particular object is stored in the allocated portion. At 430, the block of memory is released once the plurality of ongoing flows have been re-established on the second instance of the driver.

Described herein is a system for flow state save/restore, comprising: a computer comprising a processor and a memory having computer-executable instructions stored thereupon which, when executed by the processor, cause the computer to: receive a request to transition a virtual filtering platform from a first instance of a driver to a second instance of the driver, wherein the first instance of the driver manages policy and flow state for a plurality of ongoing flows between one or more client devices and one or more virtual machines; serialize the policy and state for the plurality of ongoing flows on the first instance of the driver using a one pass algorithm; unload the first instance of the driver; load the second instance of the driver; de-serialize the serialized policy and state for the plurality of ongoing flows; and, reconcile the plurality of ongoing flows on the second instance of the driver in accordance with the de-serialized policy and state for the plurality of ongoing flows.

The system can further include wherein the one pass algorithm stores information regarding a plurality of objects related to the plurality of ongoing flows in a dynamic hash table, with each entry in the dynamic hash table uniquely pointing to a particular object. The system can further include wherein the objects comprise information regarding at least one of flows, unified flows, rules, mappings, network address translation (NAT) ports, rule contexts, action contexts, or data structures.

The system can include the memory having further computer-executable instructions stored thereupon which, when executed by the processor, cause the computer to: using a single operating system memory allocation call to allocate a block of memory for storing the plurality of objects; for each object, allocating a portion of the block of memory, and, storing information regarding the particular object in the allocated portion; and releasing the block of memory once the plurality of ongoing flows have been re-established on the second instance of the driver.

The system can further include wherein the serialized policy and state for the plurality of ongoing flows is stored in memory during serialization and de-serialization. The system can further include wherein the one pass algorithm utilizes a dependency model in which an object serializes any dependencies within the object prior to serializing itself. The system can further include wherein the policy and flow state for the plurality of ongoing flows comprises complex relationships related to the ongoing flows comprising at least one of flows, unified flows, rules, mappings, network address translation ports, rule contexts, or action contexts.

The system can further include wherein the policy and flow state for the plurality of ongoing flows comprises complex relationships related to the ongoing flows comprising data structures.

Described herein is a method of performing virtual filtering platform flow state save/restore, comprising: receiving a request to transition a virtual filtering platform from a first instance of a driver to a second instance of the driver, wherein the first instance of the driver manages policy and flow state for a plurality of ongoing flows between one or more client devices and one or more virtual machines; serializing the policy and state for the plurality of ongoing flows on the first instance of the driver using a one pass algorithm; unloading the first instance of the driver; loading the second instance of the driver; de-serializing the serialized policy and state for the plurality of ongoing flows; and, reconciling the plurality of ongoing flows on the second instance of the driver in accordance with the de-serialized policy and state for the plurality of ongoing flows.

The method can further include wherein the one pass algorithm stores information regarding a plurality of objects related to the plurality of ongoing flows in a dynamic hash table, with each entry in the dynamic hash table uniquely pointing to a particular object. The method can further include wherein the objects comprise information regarding at least one of flows, unified flows, rules, mappings, network address translation (NAT) ports, rule contexts, action contexts, or data structures.

The method can further include using a single operating system memory allocation call to allocate a block of memory for storing the plurality of objects; for each object, allocating a portion of the block of memory, and, storing information regarding the particular object in the allocated portion; and releasing the block of memory once the plurality of ongoing flows have been re-established on the second instance of the driver.

The method can further include wherein the serialized policy and state for the plurality of ongoing flows is stored in memory during serialization and de-serialization. The method can further include wherein the one pass algorithm utilizes a dependency model in which an object serializes any dependencies within the object prior to serializing itself. The method can further include wherein the policy and flow state for the plurality of ongoing flows comprises complex relationships related to the ongoing flows comprising at least one of flows, unified flows, rules, mappings, network address translation ports, rule contexts, or action contexts. The method can further include wherein the policy and flow state for the plurality of ongoing flows comprises complex relationships related to the ongoing flows comprising data structures.

Described herein is a computer storage media storing computer-readable instructions that when executed cause a computing device to: receive a request to transition a virtual filtering platform from a first instance of a driver to a second instance of the driver, wherein the first instance of the driver manages policy and flow state for a plurality of ongoing flows between one or more client devices and one or more virtual machines; serialize the policy and state for the plurality of ongoing flows on the first instance of the driver using a one pass algorithm; unload the first instance of the driver; load the second instance of the driver; de-serialize the serialized policy and state for the plurality of ongoing flows; and, reconcile the plurality of ongoing flows on the second instance of the driver in accordance with the de-serialized policy and state for the plurality of ongoing flows.

The computer storage media can further include wherein the one pass algorithm stores information regarding a plurality of objects related to the plurality of ongoing flows in a dynamic hash table, with each entry in the dynamic hash table uniquely pointing to a particular object. The computer storage media can further include wherein the objects comprise information regarding at least one of flows, unified flows, rules, mappings, network address translation (NAT) ports, rule contexts, action contexts, or data structures. The computer storage media can store further computer-readable instructions that when executed cause a computing device to: use a single operating system memory allocation call to allocate a block of memory for storing the plurality of objects; for each object, allocate a portion of the block of memory, and, store information regarding the particular object in the allocated portion; and releasing the block of memory once the plurality of ongoing flows have been re-established on the second instance of the driver.

Figure 5:
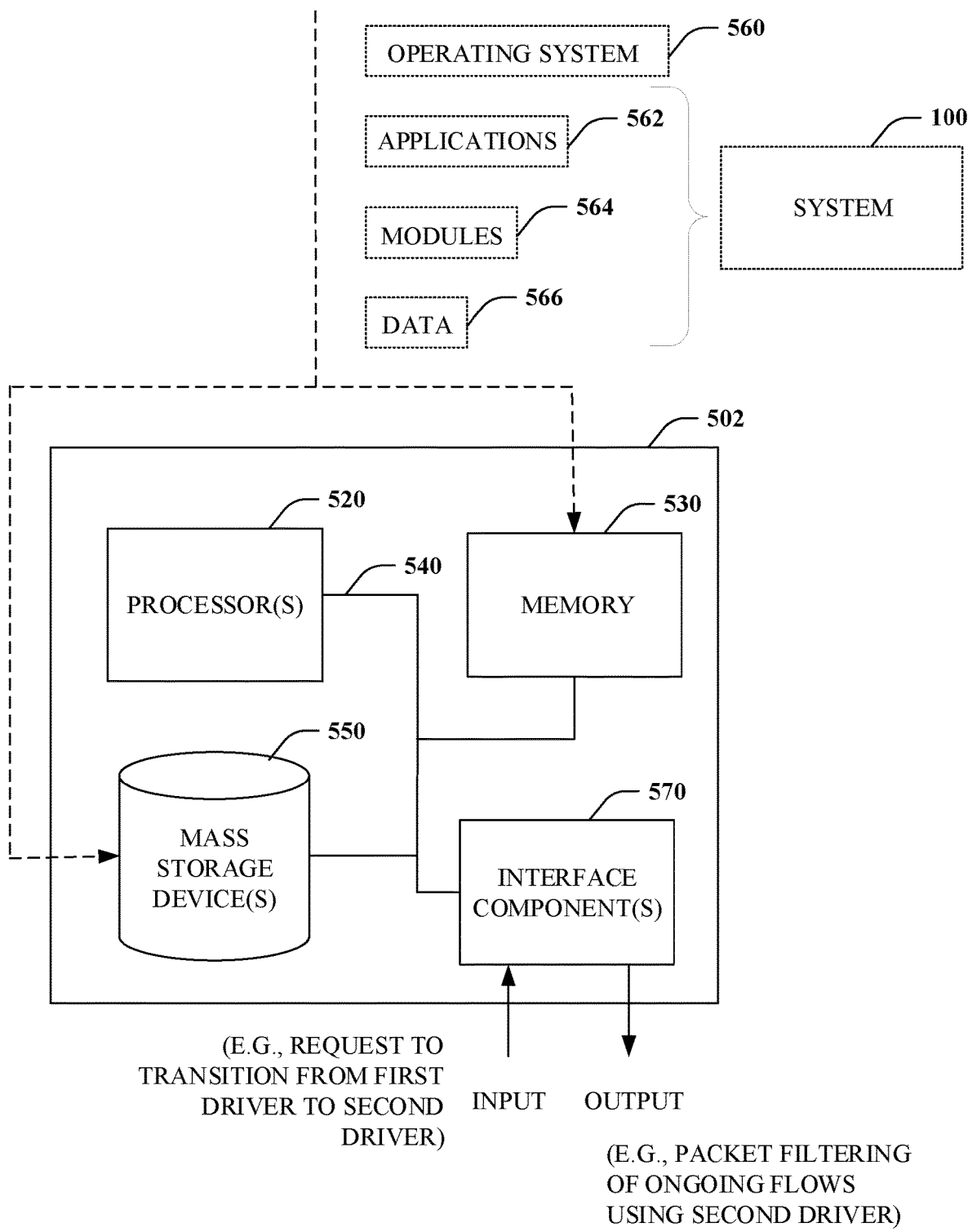
FIG. 5 is a functional block diagram that illustrates an exemplary computing system.

With reference to FIG. 5, illustrated is an example general-purpose computer or computing device 502 (e.g., mobile phone, desktop, laptop, tablet, watch, server, handheld, programmable consumer or industrial electronics, set-top box, game system, compute node, etc.). For instance, the computing device 502 may be used in a system for flow state save/restore 100.

The computer 502 includes one or more processor(s) 520, memory 530, system bus 540, mass storage device(s) 550, and one or more interface components 570. The system bus 540 communicatively couples at least the above system constituents. However, it is to be appreciated that in its simplest form the computer 502 can include one or more processors 520 coupled to memory 530 that execute various computer executable actions, instructions, and or components stored in memory 530. The instructions may be, for instance, instructions for implementing functionality described as being carried out by one or more components discussed above or instructions for implementing one or more of the methods described above.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 520 can be a graphics processor.

The computer 502 can include or otherwise interact with a variety of computer-readable media to facilitate control of the computer 502 to implement one or more aspects of the claimed subject matter. The computer-readable media can be any available media that can be accessed by the computer 502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 530 and mass storage device(s) 550 are examples of computer-readable storage media. Depending on the exact configuration and type of computing device, memory 530 may be volatile (e.g., RAM), non-volatile (e.g., ROM, flash memory, etc.) or some combination of the two. By way of example, the basic input/output system (BIOS), including basic routines to transfer information between elements within the computer 502, such as during start-up, can be stored in nonvolatile memory, while volatile memory can act as external cache memory to facilitate processing by the processor(s) 520, among other things.

Mass storage device(s) 550 includes removable/non-removable, volatile/non-volatile computer storage media for storage of large amounts of data relative to the memory 530. For example, mass storage device(s) 550 includes, but is not limited to, one or more devices such as a magnetic or optical disk drive, floppy disk drive, flash memory, solid-state drive, or memory stick.

Memory 530 and mass storage device(s) 550 can include, or have stored therein, operating system 560, one or more applications 562, one or more program modules 564, and data 566. The operating system 560 acts to control and allocate resources of the computer 502. Applications 562 include one or both of system and application software and can exploit management of resources by the operating system 560 through program modules 564 and data 566 stored in memory 530 and/or mass storage device (s) 550 to perform one or more actions. Accordingly, applications 562 can turn a general-purpose computer 502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 562, and include one or more modules 564 and data 566 stored in memory and/or mass storage device(s) 550 whose functionality can be realized when executed by one or more processor(s) 520.

In some embodiments, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 502 also includes one or more interface components 570 that are communicatively coupled to the system bus 540 and facilitate interaction with the computer 502. By way of example, the interface component 570 can be a port (e.g., serial, parallel, PCMCIA, USB, FireWire, etc.) or an interface card (e.g., sound, video, etc.) or the like. In one example implementation, the interface component 570 can be embodied as a user input/output interface to enable a user to enter commands and information into the computer 502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 570 can be embodied as an output peripheral interface to supply output to displays (e.g., LCD, LED, plasma, etc.), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for flow state save/restore, comprising:
a processor and a memory having computer-executable instructions stored thereupon which, when executed by the processor, cause the system to:
receive a request to transition a first instance of a driver on a virtual filtering platform to a second instance of the driver, wherein the driver is configured to apply policy and flow state for a plurality of ongoing flows between one or more client devices and one or more virtual machines;
serialize the policy and state for the plurality of ongoing flows on the first instance of the driver using a one pass algorithm;
allocate a block of memory for storing a plurality of objects related to the plurality of ongoing flows;
for each of the objects, store information associated with each object in a portion of the allocated block of memory;
unload the first instance of the driver;
load the second instance of the driver;
de-serialize the serialized policy and state for the plurality of ongoing flows;
reconcile the plurality of ongoing flows on the second instance of the driver in accordance with the de-serialized policy and state for the plurality of ongoing flows; and
release the block of allocated memory in response to the plurality of ongoing flows having been re-established on the second instance of the driver.

2. The system of claim 1, wherein the one pass algorithm stores information regarding a plurality of objects related to the plurality of ongoing flows in a dynamic hash table, with each entry in the dynamic hash table uniquely pointing to a particular object.

3. The system of claim 2, wherein the objects comprise information regarding at least one of flows, unified flows, rules, mappings, network address translation (NAT) ports, rule contexts, action contexts, or data structures.

4. The system of claim 1, the memory having further computer-executable instructions stored thereupon which, when executed by the processor, cause the computer to:
wherein the block of memory is allocated using a single operating system memory allocation call.

5. The system of claim 1, wherein the serialized policy and state for the plurality of ongoing flows is stored in memory during serialization and de-serialization.

6. The system of claim 1, wherein the one pass algorithm utilizes a dependency model in which an object serializes any dependencies within the object prior to serializing itself.

7. The system of claim 1, wherein the policy and flow state for the plurality of ongoing flows comprises complex relationships related to the ongoing flows comprising at least one of flows, unified flows, rules, mappings, network address translation ports, rule contexts, or action contexts.

8. The system of claim 1, wherein the policy and flow state for the plurality of ongoing flows comprises complex relationships related to the ongoing flows comprising data structures.

9. A method of updating a virtual filtering platform, comprising:
receiving a request to transition a first instance of a driver on a virtual filtering platform to a second instance of the driver, wherein the driver is configured to apply policy and flow state for a plurality of ongoing flows between one or more client devices and one or more virtual machines;
serializing the policy and state for the plurality of ongoing flows on the first instance of the driver using a one pass algorithm;
allocating a block of memory for storing a plurality of objects related to the plurality of ongoing flows;
for each of the objects, storing information associated with each object in a portion of the allocated block of memory;
unloading the first instance of the driver;
loading the second instance of the driver;
de-serializing the serialized policy and state for the plurality of ongoing flows;
reconciling the plurality of ongoing flows on the second instance of the driver in accordance with the de-serialized policy and state for the plurality of ongoing flows; and
releasing the block of allocated memory in response to the plurality of ongoing flows having been re-established on the second instance of the driver.

10. The method of claim 9, wherein the one pass algorithm stores information regarding a plurality of objects related to the plurality of ongoing flows in a dynamic hash table, with each entry in the dynamic hash table uniquely pointing to a particular object.

11. The method of claim 10, wherein the objects comprise information regarding at least one of flows, unified flows, rules, mappings, network address translation (NAT) ports, rule contexts, action contexts, or data structures.

12. The method of claim 10, further comprising:
wherein the block of memory is allocated using a single operating system memory allocation call.

13. The method of claim 9, wherein the serialized policy and state for the plurality of ongoing flows is stored in memory during serialization and de-serialization.

14. The method of claim 9, wherein the one pass algorithm utilizes a dependency model in which an object serializes any dependencies within the object prior to serializing itself.

15. The method of claim 9, wherein the policy and flow state for the plurality of ongoing flows comprises complex relationships related to the ongoing flows comprising at least one of flows, unified flows, rules, mappings, network address translation ports, rule contexts, or action contexts.

16. The method of claim 9, wherein the policy and flow state for the plurality of ongoing flows comprises complex relationships related to the ongoing flows comprising data structures.

17. A non-transitory computer storage media storing computer-readable instructions that when executed cause a computing device to:
- receive a request to transition a first instance of a driver on a virtual filtering platform to a second instance of the driver, wherein the driver is configured to apply policy and flow state for a plurality of ongoing flows between one or more client devices and one or more virtual machines;
- serialize the policy and state for the plurality of ongoing flows on the first instance of the driver using a one pass algorithm;
- allocate a block of memory for storing a plurality of objects related to the plurality of ongoing flows;
- for each of the objects, store information associated with each object in a portion of the allocated block of memory;
- unload the first instance of the driver;
- load the second instance of the driver;
- de-serialize the serialized policy and state for the plurality of ongoing flows;
- reconcile the plurality of ongoing flows on the second instance of the driver in accordance with the de-serialized policy and state for the plurality of ongoing flows; and
- release the block of allocated memory in response to the plurality of ongoing flows having been re-established on the second instance of the driver.

18. The non-transitory computer storage media of claim 17, wherein the one pass algorithm stores information regarding a plurality of objects related to the plurality of ongoing flows in a dynamic hash table, with each entry in the dynamic hash table uniquely pointing to a particular object.

19. The non-transitory computer storage media of claim 18, wherein the objects comprise information regarding at least one of flows, unified flows, rules, mappings, network address translation (NAT) ports, rule contexts, action contexts, or data structures.

20. The non-transitory computer storage media of claim 18,
wherein the block of memory is allocated using a single operating system memory allocation call.

* * * * *